United States Patent [19]
Taylor et al.

[11] 4,070,091
[45] Jan. 24, 1978

[54] OPTICAL FIBRE WITH ENHANCED SECURITY

[75] Inventors: John Charles Wood Taylor, Alymer; Felix Paul Kapron, Richmond, both of Canada

[73] Assignee: Northern Telecom Limited, Montreal, Canada

[21] Appl. No.: 677,759

[22] Filed: Apr. 16, 1976

[51] Int. Cl.² ............................................. G02B 5/14
[52] U.S. Cl. ............................................. 350/96 WG
[58] Field of Search ............ 350/96 WG, 96 R; 250/199; 340/380

[56] References Cited
U.S. PATENT DOCUMENTS

| | | | |
|---|---|---|---|
| 3,853,384 | 12/1974 | Pinnow et al. | 350/96 WG |
| 3,981,592 | 9/1976 | Williams | 250/199 |
| 4,000,416 | 12/1976 | Goell | 350/96 WG |

*Primary Examiner*—John K. Corbin
*Assistant Examiner*—Stewart Levy
*Attorney, Agent, or Firm*—Sidney T. Jelly

[57] ABSTRACT

An optical fibre has a light conducting core surrounded by first and second cladding layers of sequentially lower refractive index. A data-carrying signal can be propagated in the core and a monitoring signal—of a higher modal order than the data signal—can be propagated in the core and first cladding layer. Any attempt to tap the fibre and abstract data information results in aberration of the monitor signal, which can be detected. The monitor signal can be such that resolvable signals cannot be obtained from the data channel by a tap.

14 Claims, 13 Drawing Figures

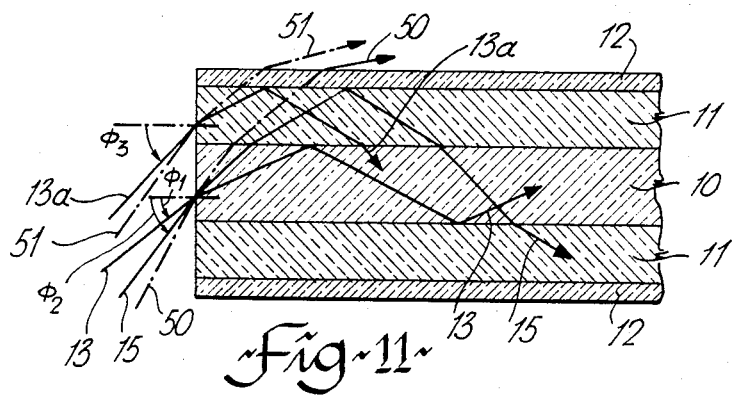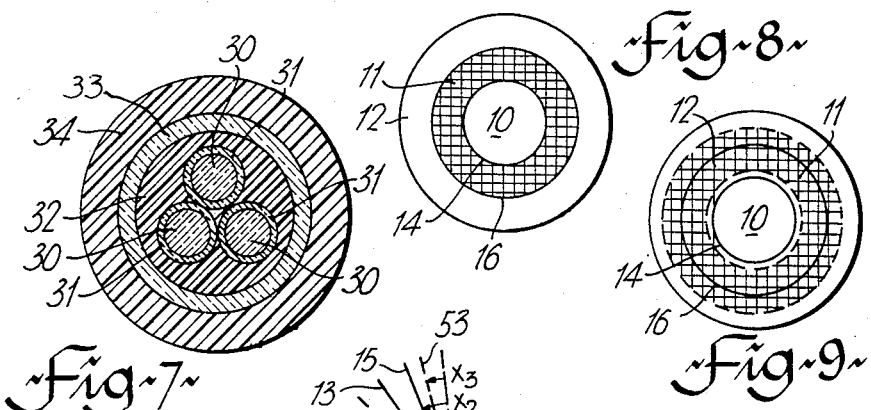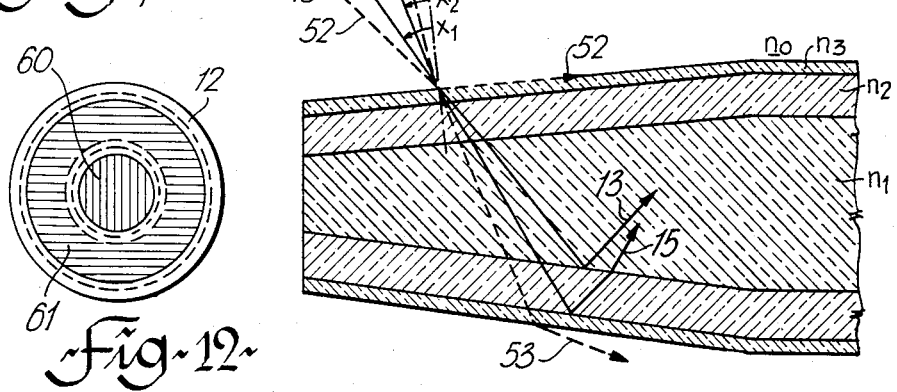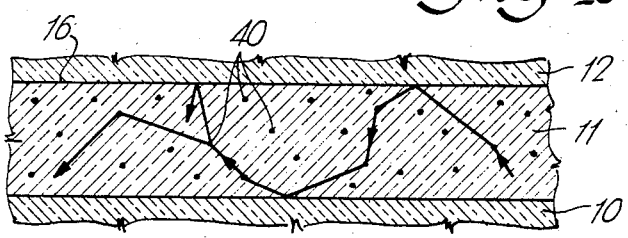

OPTICAL FIBRE WITH ENHANCED SECURITY

This invention relates to an optical fibre with enhanced security, and particularly to the improvement of security against unauthorized abstraction of information from the fibre.

Fibre-optic transmission systems have several advantages, such as high information capacity, compactness, low attenuation, immunity from atomic and electrical radiation. This latter advantage, immunity from electrical radiation, is important for high electrical field environments, avoidance of interfibre cross talk and security. However an optical fibre can be tapped such that very little of the input data signal is extracted for amplification. If the perturbation on the signal is below the detectability of the receiver, then the tap will go unnoticed.

Several tapping techniques exist. Firstly, the cable, if any, is entered and the fibre jacketing is locally removed from a fibre. The fibre may then be cut and an optical T inserted to extract some data signal. This relatively crude method will severely perturb the signal, especially at the time of the cutting, and the tap would be readily detected at the receiver. A partial diagonal cut may reflect out a sufficient strength of signal. Alternatively, the fibre cladding may be removed locally, for example chemically or mechanically, and some signal extracted as by a contacting prism. This may go undetected. In a further alternative, the cladding is not removed and the extracting element obtains either evanescent liquid or radiated light. This method is even less susceptible to detection. Also, a local fibre diameter reduction, as in a taper, will release some higher order modes. The above methods may be enhanced by local stressing and/or bending the fibre appropriately.

Since some of the possible tapping methods may be undetected at the receiver it is desirable to improve the possibility of detection and/or prevent a useful signal being abstracted. Generally, the invention provides for the use of a monitoring signal separate from the data signal.

The invention will be readily understood by the following description of certain embodiments, by way of example, in conjunction with the accompanying drawings, in which:

FIGS. 6 and 7 are diagrammatic cross-sections of multicore optical fibres;

FIGS. 8 and 9 are diagrammatic end views of fibres illustrating the provision of end mirrors;

FIG. 10 is a diagrammatic longitudinal cross-section through part of a fibre core and cladding illustrating index or reflecting centres in the cladding;

FIG. 11 is a longitudinal cross section through a fibre end similar to that of FIG. 1, showing launching angles;

FIG. 12 is an end view of the fibre of FIG. 11 illustrating detector means;

FIG. 13 is a longitudinal cross section through a fibre end, illustrating side launching into the fibre.

Figure 1:
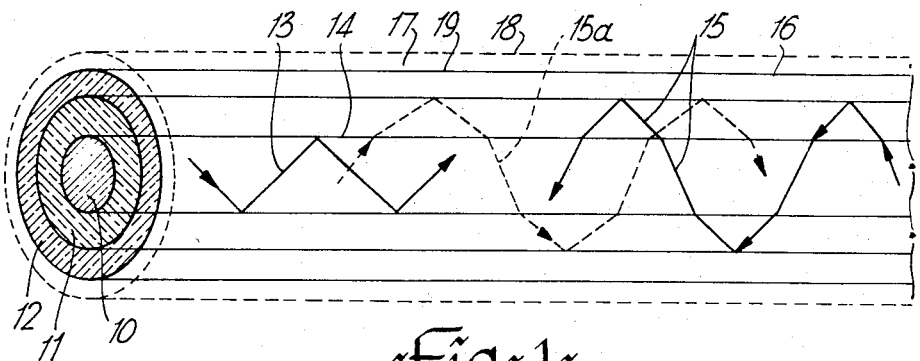
FIG. 1 is a diagrammatic illustration of one form of optical fibre.
Figure 2:
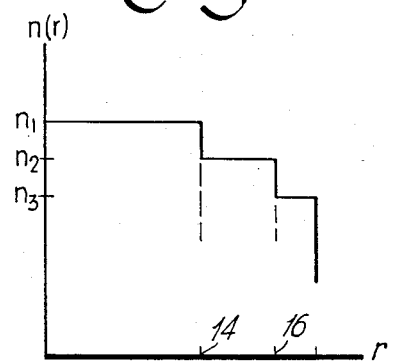
FIG. 2 is a curve illustrating the refractive index (n) profile across the radius (r) of the fibre in FIG. 1.

As illustrated in FIG. 1, an optical fibre has a core 10 of refractive index $n_1$ surrounded by a cladding 11 of refractive index $n_2$ in turn surrounded by a second cladding 12 of refractive index $n_3$. The refractive indices $n_1$, $n_2$ and $n_3$ are of reducing value, as indicated in FIG. 2. The data signal is carried in the core 10 as represented by the light rays 13, the light rays 13 reflecting off the interface 14 between core and cladding. The monitor signal is carried in both the core 10 and the inner cladding 11, as represented by the light rays 15 or 15a. The rays, 15 or 15a refract through the interface 14 and reflect off the interface 16 between the cladding layers 11 and 12.

Since interface 16 surrounds interface 14, and since the rays 15, 15a are of higher mode order than the rays 13, the monitor signal is more loosely bound in the fibre than is the data signal. Hence the monitor signal is more sensitive than the data signal to any of the above referred tapping techniques.

The data signal is injected as a beam of low order rays into the core 10 at one end, the signal being detected at the other end. The monitor signal can be injected as high order rays near the detector or output end of the fibre in the opposite direction to the data rays 13, as shown by rays 15. Alternatively the monitor signal can be injected as high order rays at the data input end of the fibre, as shown by rays 15a.

An advantage of this system is that the high and low order mode groupings are kept separated by the index discontinuity at interface 16. This makes the directionability of the monitor signal relative to the data signal less important and also makes the fibre more suitable for long distances and levels.

Figure 4:
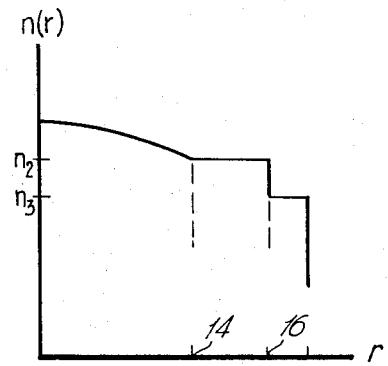
FIG. 4 is a curve illustrating the refractive index (n) profile across the radius of the fibre in FIG. 3.
Figure 3:
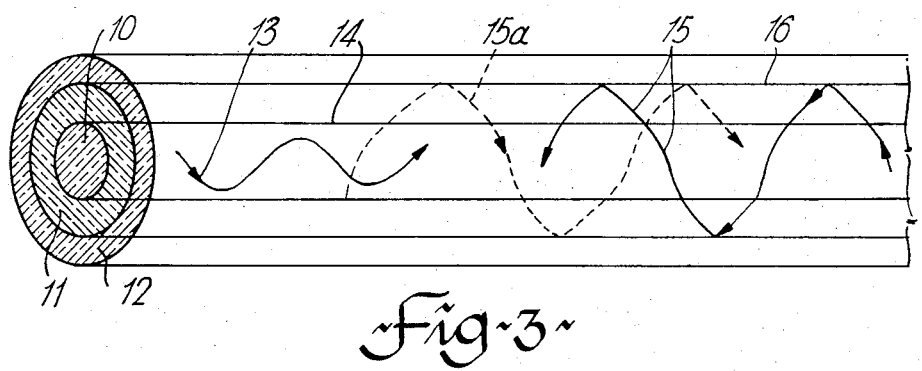
FIG. 3 is a diagrammatic illustration of another form of optical fibre.

FIGS. 3 and 4 illustrate an alternative form of fibre in which the core 10 has a graded refractive index, as particularly indicated by the index profile in FIG. 4. The graded index core substantially reduces modal differential time delays and thus narrows the data impulse response width. The low order light rays 13 follow quasi-sinusoidal paths rather than zig-zag paths as in FIG. 1. The profile of the refractive index of the core is typically close to parobolic. While in FIGS. 3 and 4 the cladding layer 11 is shown with a constant refractive index $n_2$, this cladding may also have a graded index, the index decreasing as the radius increases.

Figure 5:
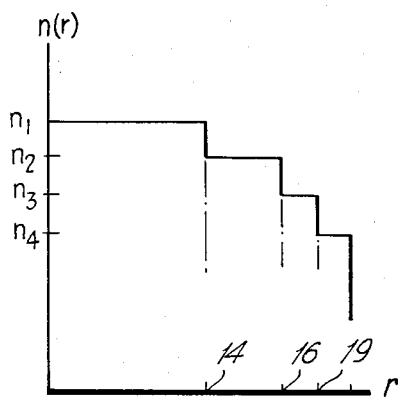
FIG. 5 is a curve illustrating the refractive index (n) profile across the radius of a modified form of the fibre of FIG. 1.

A further modification, illustrated in FIGS. 1 and 5, is to add a further cladding layer 17 indicated by dotted line 18 in FIG. 1, and giving a further interface 19 between cladding layers 12 and 18. The cladding 18 has a lower refractive index than the other layers, as indicated in FIG. 5. A second monitor signal may be injected into the cladding 12 and confined by the interface 19. The two monitor signals may be the same or different and may both travel in the same direction or in opposite directions. This may be extended to multiple data signals and multiple monitoring signals.

Figure 6:
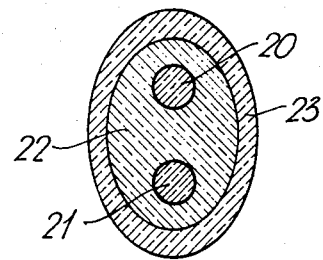

FIG. 6 illustrates a form of optical fibre having two cores 20 and 21 surrounded by common cladding 22 and an outer cladding 23. The cores 20 and 21 may carry independent data signals while the monitor signal is carried throughout both the cores 20 and 21 and the cladding 22. This can be applied to a cable concept, as illustrated in FIG. 7. There are three cores 30 each independently clad by a layer of cladding material 31.

The three clad fibres are surrounded by a low index cladding material 32, which can be a cushioning transparent material. The monitor signal is carried in the fibres 30, claddings 31 and cladding 32. A further layer 33 acts as an outer cladding layer, with a lower refractive index than cladding 32. A further layer 34 is provided for protection and strength.

Graded refractive indices can be applied to the embodiment illustrated in FIGS. 6 and 7, both for the cores, and for the cladding. Additional cladding layers can also be provided to make additional monitor signals to be provided.

With codirectional signalling, that is data and monitor signals travelling in the same direction, data cannot easily be extracted without affecting the monitor signal. Contradirectional propagation is thus less suitable for those tapping methods that are sensitive to direction.

Codirectional data and monitor transmissions may be preferred over the contradirectional type because it will generally result in more monitor signal being tapped out. This means a larger monitor noise-to-data ratio inflicted upon the intruder and a greater detection sensitivity for the operator. However, contradirectional signalling has the advantage of proximity of the monitor receiver to the data transmitter. This allows for convenient alarming for transmitter shutdown. In the codirectional case an alarming channel, probably electrical and itself subject to sabotage, is necessary. To utilize the advantages of both types of signalling, launching is codirectional, with the monitor signal retro-reflected at the data output end and received back at the input end. It is also commented that a single tap with give rise to two perturbations in the monitor signal.

Retro-reflection is obtained by providing a reflective surface at the data output end for the monitor-signal-only layer or layers. FIGS. 8 and 9 are end views on a fibre, for example as in FIGS. 1 and 3, the same reference numerals applied, FIG. 8 illustrating—in the hatched area—a mirrored end formed by any method well known in the optical arts—for example metallization or dielectric layers—extending over the whole end area of the inner cladding layer 11. FIG. 9 varies in that the mirrored end avoids the interface 14 and overalps part of the outer cladding 12. This also avoids possible retro-reflection of data rays. In both examples some monitor signal will pass out through the central uncoated region, so that retro-reflectivity will be less than about half. The retro-reflectivity can be increased by angle-selective reflecting layers covering the whole end face so that high modes are reflected while low modes pass through.

The more loosely bound monitor signal can be made much stronger than the data signal. The tapped signal mix is then composed predominantly of the monitor signal so that the ratio of data signal-to-monitor noise is very small. It is possible to make the ratio so small that the data signal portion of the total mixed signal is below noise level and is therefore unresolvable.

Monitor noise can be further enhanced by use of a noisy source with a bandwidth exceeding that of the data signal.

Alternatively, in the present invention, the monitor channel can itself add noise to the monitor signal via the introduction of fibre fluctuations into the monitor-signal-only region. For example, in the embodiments of FIGS. 1 and 3 the monitor signal can be scrambled by making the interface 16 in FIG. 1 and FIG. 3 such that they randomly scatter the monitor signal rays 15 and 15a. This may be done by refractive index and/or boundary fluctuations at the interface. A typical example is to roughen the surface of layer 11 before forming layer 12. In the modified form of FIG. 1, the surface of layer 11 is roughened before forming layer 12 and then the surface 19 of layer 12 roughened before forming layer 17. Another method is to distribute scattering fluctuations throughout the layer 11 in FIG. 1 and FIG. 3 and in layer 12 in the modified form of FIG. 1, with layer 17, via tiny index or reflectivity centres. This is seen in FIG. 10 which illustrates in cross-section part of layer 11 and adjacent parts of layers 12 and core 10 only with index or reflective centres indicated at 40. While only illustrated two dimensionally, it will be appreciated that the effect is three dimensionally in layer 11, and also similary in layer 17 for the modified form of FIG. 1.

Either method has the effect of inducing coupling amongsthigh order monitor modes. Hence rays 15 and 15a will experience randomly different path lengths down the fibre and any regularity in the monitor signal will be scrambled, or a noisy injected monitor signal made more noisy. An intruder will then find it more difficult to separate the tapped noisy monitor signal from the weaker tapped data signal.

The tapped signal cannot then be resolved to yield the data; a security alarm may not be necessary. With a noisy monitor, an alarm would respond to the noise d.c. level. In systems in which the tapped signal would be resolved to obtain a data signal, a detector can be provided to detect the relatively large perturbations of the monitor signal which would be occasioned by a tap. A detector could merely indicate that a fibre is tapped or could shut the system down.

Relatively large perturbations of the monitor signal will occur because a region in which only the monitor signal propagates must be crossed before access is obtained to the data signal region.

Launching or receiving may be done through the fibre end faces or through the side of a tapered fibre. In both cases it must be ensured that the data rays 13 of FIG. 1 make an angle $\theta_D$ with the axis inside the fibre satisfying, $$O \leq \theta_D \leq \theta_1 = \cos^{-1}(n_2/n_1). \quad (1)$$

For the monitor rays 15, $$\theta_1 \leq \theta_M \leq \theta_2 = \cos^{-1}(n_3/N_1). \quad (2)$$

For minimal crosstalk the ranges of $\theta_D$ and $\theta_M$ should be well separated.

For end-launching as shown in FIG. 11, the data source must illuminate only the core up to a certain angle ($\phi_1$) measured with respect to the end-face normal. The monitor source can illuminate the core at large angles (up to $\phi_2$ beyond which the rays 50 are not trapped) and/or it can illuminate the first cladding up to a certain angle ($\phi_3$, beyond which rays 51 are untrapped). The required angular and spatial tolerance can be achieved by those skilled in the optical arts. The angles are given by:

$$n_o \sin \phi_1 = (n_1^2 - n_2^2)^{1/2}$$

$$n_o \sin \phi_2 = (n_1^2 - n_3^2)^{1/2} \quad (3)$$

$$n_o \sin \phi_3 = (n_2/n_1)(n_1^2 - n_3^2)^{1/2}$$

where $n_o$ is the index of the medium surrounding the fibre.

For end-detection the situation is analagous and optical techniques providing angular and spatial resolution can be used. Alternatively, and more simply, as shown in FIG. 12, a detector 60 covering essentially the core 10 will intercept the signal $D + fM$, where $f$ is some fraction of the monitor signal. A separate detector 61 covering essentially the first cladding 11 will intercept the remaining monitor $(f-1)M$. An electronic circuit can simply perform a subtraction to give D and M separately.

For side-launching, as shown in FIG. 13, the fibre is up-tapered and surrounded by a higher index medium $n_o$. The data source rays must illuminate between a range of angles measured with respect to the side normal ($X_1$ to $X_2$, above which the rays 52 do not enter the fibre). Similarly the monitor rays must illuminate an angular range ($X_2$ to $X_3$, below which rays 53 pass through the fibre). The angles are given by:

$$n_o \sin X_1 = n_3$$
$$n_o \sin X_2 = n_1 \sin [\sin^{-1}(n_2/n_1) - 2\epsilon] \quad (4)$$
$$n_o \sin X_3 = n_1 \sin [\sin^{-1}(n_3/n_1) - 2\epsilon]$$

where $\epsilon$ is the taper half-angle. These equations for side-launching correspond to equations (3) for end launching.

For side-detection the situation is analogous and optical techniques providing angular and spatial resolution can be used. The fibre is down-tapered.

In a hybrid scheme it may be simpler, for example, to end-launch the data and side launch the monitor. At the other terminal the data may be end-detected and the monitor side-detected. Various permutations of this arrangement are possible. These may be adapted to codirectional or contradirectional monitoring

What is claimed is:

1. An optical fibre comprising:
   a light conducting core having a predetermined minimum refractive index and forming a first light conducting path;
   a first, light conducting, cladding layer surrounding said core and having a constant refractive index lower than said minimum refractive index of said core and forming with said core a second light conducting path;
   a second cladding layer over said first cladding layer and having a constant refractive index lower than the refractive index of the first cladding layer;
   whereby a first signal will propagate only in the core and a second signal will propagate in both the core and the first, light conducting, cladding layer.

2. An optical fibre as claimed in claim 1, including a further cladding layer over said second cladding layer, said further cladding layer having a lower refractive index than said second cladding layer.

3. An optical fibre as claimed in claim 1, said core having a constant refractive index.

4. An optical fibre as claimed in claim 1, said core having a graded refractive index, said index varying across the radius of the fibre, and being higher at the centre of the fibre and lower at an interface with said first cladding layer.

5. An optical fibre as claimed in claim 1, comprising two light conducting cores, said cores extending in a spaced apart relationship, said first cladding layer surrounding both cores.

6. An optical fibre as claimed in claim 1, comprising a plurality of light conducting cores, each core surrounded by a first cladding layer of lower refractive index than the core, said second cladding layer surrounding each clad core, and a further cladding layer over said second cladding layer, said further cladding layer having a lower refractive index than said second cladding layer.

7. An optical fibre as claimed in claim 1, said fibre having an input end and an output end, and including a mirror at said output end, said mirror aligned with said first cladding layer.

8. An optical fibre as claimed in claim 7, said mirror extending radially inward from an interface between said first and second cladding layers for a substantial part of the thickness of said first cladding layer and extending radially outward from said interface a mirror part of the thickness of said second cladding layer.

9. An optical fibre as claimed in claim 7, including data signal means at said input end of said fibre and positioned to launch data signals into said core, data signal detector means at said output end of said fibre, monitor signal means at said input end positioned to launch a monitor signal into said first cladding layer and monitor signal detector means at said input end, said monitor signal detector means arranged to detect monitor signals retroreflected by said mirror at said output end of said fibre.

10. An optical fibre as claimed in claim 1, including signal scattering centres distributed throughout said first cladding layer.

11. An optical fibre as claimed in claim 9, said signal scattering centres comprising reflectivity centres.

12. An optical fibre as claimed in claim 1, including data signal means at an input end of said fibre and positioned to launch data signals into said core, and data signal detector means at an output end of said fibre.

13. An optical fibre as claimed in claim 12, including monitor signal means at said input end of said fibre and positioned to launch a monitor signal into said first cladding layer, and monitor signal detector means at said output end of said fibre.

14. An optical fibre as claimed in claim 13, including signal producing means associated with said monitor signal detector means for producing an output signal indicative of said monitor signal, and means responsive to a predetermined variation in said output signal.

* * * * *